United States Patent
Chao et al.

(10) Patent No.: US 10,370,523 B2
(45) Date of Patent: *Aug. 6, 2019

(54) INSULATING GLASS SEALANTS BASED ON POLYURETHANES AND ORGANICALLY-MODIFIED NANOCLAYS

(71) Applicant: Fina Technology, Inc., Houston, TX (US)

(72) Inventors: Herbert Chao, Paoli, PA (US); Taejun Yoo, Downingtown, PA (US); Nan Tian, Wilmington, DE (US)

(73) Assignee: Fina Technology, Inc., Houston, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/477,699

(22) Filed: Apr. 3, 2017

(65) Prior Publication Data

US 2018/0282524 A1 Oct. 4, 2018

(51) Int. Cl.
| | |
|---|---|
| C08F 36/04 | (2006.01) |
| C08F 136/04 | (2006.01) |
| C08F 236/04 | (2006.01) |
| C08G 18/69 | (2006.01) |
| C08K 9/04 | (2006.01) |
| C08K 3/34 | (2006.01) |
| B32B 17/06 | (2006.01) |
| B32B 7/14 | (2006.01) |
| C08L 9/00 | (2006.01) |
| C08L 47/00 | (2006.01) |
| C08L 75/04 | (2006.01) |
| C08L 75/08 | (2006.01) |

(52) U.S. Cl.
CPC ............ *C08K 9/04* (2013.01); *B32B 7/14* (2013.01); *B32B 17/06* (2013.01); *C08K 3/346* (2013.01); *C08L 9/00* (2013.01); *C08L 47/00* (2013.01); *C08L 75/04* (2013.01); *C08L 75/08* (2013.01); *B32B 2315/16* (2013.01); *B32B 2375/00* (2013.01); *C08F 36/045* (2013.01); *C08F 136/045* (2013.01); *C08F 236/045* (2013.01); *C08G 18/69* (2013.01); *C08L 2201/14* (2013.01); *C08L 2666/62* (2013.01)

(58) Field of Classification Search
None
See application file for complete search history.

(56) References Cited

U.S. PATENT DOCUMENTS

| | | | |
|---|---|---|---|
| 4,063,002 A | 12/1977 | Wilson, Jr. | |
| 5,589,543 A | 12/1996 | Yokelson et al. | |
| 5,925,724 A | 7/1999 | Cenens et al. | |
| 6,060,560 A | 5/2000 | St. Clair | |
| 6,211,324 B1 | 4/2001 | Haider et al. | |
| 6,780,957 B1 | 8/2004 | Haider et al. | |
| 7,687,121 B2 | 3/2010 | Landon et al. | |
| 8,257,805 B2 | 9/2012 | Landon et al. | |
| 8,580,361 B2 | 11/2013 | Landon | |
| 8,597,741 B2 | 12/2013 | Landon et al. | |
| 9,994,669 B2 * | 6/2018 | Tian | C08G 18/6204 |
| 2004/0158003 A1 | 8/2004 | Ruckel et al. | |
| 2007/0173597 A1 | 7/2007 | Williams et al. | |
| 2007/0178256 A1 | 8/2007 | Landon | |
| 2011/0151154 A1 * | 6/2011 | Landon | B82Y 30/00 |
| | | | 428/34 |
| 2012/0165474 A1 | 6/2012 | McPhee et al. | |
| 2012/0253001 A1 | 10/2012 | Radhakrishnan et al. | |
| 2013/0022404 A1 | 1/2013 | Stinson | |
| 2013/0078397 A1 | 3/2013 | Chao et al. | |
| 2013/0123379 A1 | 5/2013 | Mcphee | |
| 2014/0378570 A1 | 12/2014 | Tabor et al. | |
| 2015/0218428 A1 | 8/2015 | Krishnan et al. | |
| 2016/0272750 A1 * | 9/2016 | Voci | C08G 18/4854 |
| 2016/0376386 A1 | 12/2016 | Yoo et al. | |
| 2017/0190829 A1 | 7/2017 | Tian et al. | |

FOREIGN PATENT DOCUMENTS

| | | |
|---|---|---|
| CN | 1167735 C | 9/2004 |
| EP | 1279687 A2 | 1/2003 |
| EP | 2899255 A1 | 7/2015 |
| KR | 20150135305 A | 12/2015 |
| WO | 2007089699 A2 | 8/2007 |
| WO | 2012018682 A1 | 2/2012 |

OTHER PUBLICATIONS

Henning et al., copending U.S. Appl. No. 16/068,619, filed Jul. 6, 2018. (Year: 2018).*
Sun, P., et al., "Rubber/exfoliated-clay nanocomposite gel: Direct exfoliation of montmorillonite by telechelic liquid rubber," 2004, pp. 1664-1666, vol. 49(15), Chinese Science Bulletin.
Chen, T,, et al., "Exfoliation of organo-clay in telechelic liquid polybutadiene rubber," 2005, pp. 4030-4033, vol. 38(9), Macromolecules.
Wang, X., et al., "Enhanced exfoliation of organoclay in partially end-functionalized non-polar polymer," 2009, pp. 190-195, vol. 294(3), Macromolecular Materials and Engineering.
Ruth, P.N., et al., "Dispersion of nanoclays in urethane monomers," 2009, p. 528, vol. 50(2), Polymer Preprints (Proceedings Published 2010 by the American Chemical Society).

(Continued)

*Primary Examiner* — Richard A Huhn
(74) *Attorney, Agent, or Firm* — Albert Shung

(57) ABSTRACT

Curable compositions are prepared using polyisocyanates, hydrophobic hydroxyl-terminated polymers (such as hydroxyl-terminated polyfarnesenes and hydroxyl-terminated polydienes) and organically-modified nanoclays, optionally in combination with chain extenders and/or urethane catalysts. When cured, the compositions yield polyurethane-based sealants useful in insulating glass units which have improved (lowered) moisture vapor transmission rate values as a consequence of the inclusion of the organically-modified nanoclays.

19 Claims, No Drawings

(56) References Cited

OTHER PUBLICATIONS

Zhu, J.J., et al., "Studies on Polybutadiene / MMT nanocomposites," 2010, pp. 166-168, vol. 38(5), Guangzhou huagong, China Academic Journal Electronic Publishing House (Abstract only).

Bae, S.B., et al., "A novel mechanism of exfoliation and physical properties of PU/Organoclay nanocomposites," 2013, pp. 3089-3095, vol. 129(6), Journal of Applied Polymer Science, DOI: 10.1002/app,38622.

Carrado, K.A., et al., "Acid activation of bentonites and polymer-clay nanocomposites," Apr. 2009, pp. 111-116, vol. 5, Elements.

Zhu, J.J., et al., "Study on clay dispersion and confinement in polybutadiene/clay nanocomposites," 2011, pp. 273-276, vol. 52(5), Huaxue Shijie (Abstract only).

Non Final Office Action for U.S. Appl. No. 14/989,140, dated May 2, 2017, 15 pages.

Final Office Action for U.S. Appl. No. 14/989,140, dated Nov. 14, 2017, 15 pages.

Internatinal Search Report and Written Opinion for International Application No. PCT/US2018/024525, dated Jul. 4, 2018, 13 pages.

International Preliminary Report on Patentability for International Application No. PCT/US2016/046519, dated Jul. 10, 2018, 12 pages.

International Search Report and Written Opinion for International Application No. PCT/US2016/046519, dated May 17, 2017, 20 pages.

Cray Valley Products for Urethane Elastomers Hydroxyl Terminated Functional Liquid Poly bd® Resins, 24 pages (2011).

Invitation to Pay Additional Fees for International Application No. PCT/US2016/046519, dated Nov. 11, 2016, 11 pages.

\* cited by examiner

INSULATING GLASS SEALANTS BASED ON POLYURETHANES AND ORGANICALLY-MODIFIED NANOCLAYS

FIELD OF THE INVENTION

The invention relates to curable compositions that may be used to prepare insulating glass sealants based on polyurethanes. More specifically, the invention relates to curable compositions that include hydroxyl-terminated polymers (such as hydroxyl-terminated polyfarnesenes and hydroxyl-terminated polydienes), polyisocyanates and organically-modified nanoclays.

BACKGROUND OF THE INVENTION

Insulated glass units (IGUs) generally comprise a pair of glass sheets, maintained in a spaced-apart relationship to each other by a spacer assembly, and a sealing assembly which extends around the periphery of the inner facing surfaces of the glass sheets to define a sealed and insulating air space between the glass sheets. Typically, the spacer assembly is a hollow form which extends around the periphery of the inside facing surfaces of the glass sheets and which is filled with a water-absorbent material, such as a molecular sieve or another dehydration element, to keep the enclosed hollow space dry. The inner surfaces of the glass sheets are attached to the outer surface of the spacer assembly by means of a sealant or adhesive. Generally, the sealant or adhesive is also used to seal the edges of the insulated glass unit so as to establish a barrier which prevents moisture from penetrating into the interior annular space of the unit.

The sealant must have a combination of properties for satisfactory use. For example, the sealant must have a very low moisture vapor transmission rate (MVTR) so that moisture is prevented from entering the dry annular space between the panes of glass. Moisture in such space tends to condense on the interior faces of the panes, creating visibility and aesthetic problems. If the sealant does not have a satisfactory MVTR, the longevity of the insulated unit may be severely reduced. The sealant should have good elongation and flexibility so that it "yields" during contraction and expansion of the insulated glass structure, for example, to relieve stress on the glass caused by changes in temperature. The sealant desirably also forms an excellent bond with the glass which is not degraded over long periods of use when exposed to sunlight, moisture, and large temperature changes. Tensile adhesion strength is an important indicator of bond strength.

Two of the major types of sealants currently used in the insulated glass industry are: (A) thermoplastic one-part hot melt butyl type sealants, and (B) the chemically-curing thermoset sealant products generally from the generic families of polysulfides, polyurethanes, and silicones. Hot melt butyl insulated glass sealants have been used with moderate success for a number of years in the insulated glass industry. However, there are significant shortcomings with this technology that have limited the application of hot melt butyl insulated glass sealants. Primarily, the hot melt butyl is a thermoplastic material, and not a thermoset material. Thermoplastic sealants are well known to soften when exposed to heat. Therefore, the insulated glass units sold in the marketplace which employ thermoplastic sealants are known to flow or deform, when placed under load, to relieve such stresses. This characteristic is exaggerated at high temperatures, which can occur in insulated glass units, especially those utilizing solar control glass. As a result, insulated glass units made with hot melt butyl sealants have difficulty passing stress and temperature tests common in industry, and are often limited for use in relatively small, light insulated glass units. Additionally, extreme care must be taken to support the insulated glass unit during handling, shipping and installation, resulting in additional costs. Furthermore, the hot melt sealants previously employed must be applied to the insulated glass units at temperatures exceeding 300° F. These high temperature requirements often present increased manufacturing costs, for example due to higher energy consumption and the need for specialized high-temperature equipment, as well as operational and safety challenges. Attempts to utilize lower temperature hot melts have been known to cause flow problems with the sealant.

More recently, sealants based on polyurethane chemistry have been used for insulated glass units. These polyurethane-based sealants employ polymeric polyols, which are reacted with polyisocyanate to form a sealant. Various types of different polyols have been proposed for use in such sealants. Hydroxyl terminated polyols with very non-polar backbones (e.g., hydroxyl-terminated polybutadiene) can be used to introduce hydrophobicity into polyurethanes. However, polyols having a polybutadiene backbone, for example, usually have a much higher viscosity than those based on a polyether backbone. To reduce the viscosity of hydroxyl-terminated polybutadienes, one can either blend polyether polyols into the polyol mixture or make prepolymers with increased —NCO percentage. These approaches in general are not ideal because the final polyurethane products tend to have inferior hydrophobicity.

Thus, there is a need for improved curable compositions having relatively low viscosity for easier application that, once cured to form polyurethane-based sealants, are sufficiently hydrophobic for moisture-sensitive applications (such as their use as insulating glass sealants) and that have improved mechanical properties.

SUMMARY OF THE INVENTION

It has now been discovered that curable compositions useful for preparing insulating glass sealants may be formulated using hydrophobic hydroxyl-terminated polymers (such as hydroxyl-terminated polyfarnesenes and hydroxyl-terminated polydienes), polyisocyanates and organically-modified nanoclays. The combination of the hydrophobic hydroxyl-terminated polymer(s) and organically-modified nanoclay provides a cured sealant having a desirably reduced permeability to water vapor, as measured by moisture vapor transmission rate. A hydroxyl-terminated polyfarnesene may be used to help lower the viscosity of the curable composition, as compared to what the viscosity would be if a hydroxyl-terminated polybutadiene of comparable molecular weight were to be used as the sole hydroxyl-terminated polymer in the curable composition.

Certain aspects of the present invention may be summarized as follows.

Aspect 1: A curable composition useful for producing an insulating glass sealant, wherein the curable composition comprises, consists essentially of, or consists of at least one organically-modified nanoclay, at least one hydroxyl-terminated polymer selected from the group consisting of hydroxyl-terminated polyfarnesenes and hydroxyl-terminated polydienes, and at least one polyisocyanate.

Aspect 2: The curable composition of claim 1, wherein the at least one hydroxyl-terminated polymer comprises, consists essentially of or consists of a hydroxyl-terminated polyfarnesene having a number average molecular weight of from about 1000 to about 20,000 g/mole.

Aspect 3: The curable composition of Aspect 1, wherein the at least one hydroxyl-terminated polymer has an average hydroxyl functionality of at least about 1.8.

Aspect 4: The curable composition of Aspect 1, wherein the at least one hydroxyl-terminated polymer comprises, consists essentially of or consists of at least one hydroxyl-terminated polydiene.

Aspect 5: The curable composition of Aspect 4, wherein the at least one hydroxyl-terminated polydiene is selected from the group consisting of hydroxyl-terminated polybutadienes, hydroxyl-terminated polyisoprenes and hydroxyl-terminated polymyrcenes.

Aspect 6: The curable composition of any of Aspects 1 to 5, wherein the at least one hydroxyl-terminated polymer comprises, consists essentially of or consists of at least one hydroxyl-terminated polyfarnesene.

Aspect 7: The curable composition of any of Aspects 1 to 6, wherein the at least one hydroxyl-terminated polymer comprises, consists essentially of or consists of at least one hydroxyl-terminated polyfarnesene and at least one hydroxyl-terminated polybutadiene.

Aspect 8: The curable composition of any of Aspects 1-7, wherein the at least one hydroxyl-terminated polymer comprises, consists essentially of or consists of at least one hydroxyl-terminated polyfarnesene which is a hydroxyl-terminated polyfarnesene homopolymer.

Aspect 9: The curable composition of any of Aspects 1-8, wherein the at least one hydroxyl-terminated polymer comprises, consists essentially of or consists of at least one hydroxyl-terminated polyfarnesene which is a hydroxyl-terminated polyfarnesene copolymer comprised of, consisting essentially of or consisting of copolymerized units of farnesene and at least one diene co-monomer.

Aspect 10: The curable composition of any of Aspects 1-9, wherein the curable composition is comprised of, consists essentially of or consists of from 5% to 100% by weight hydroxyl-terminated polyfarnesene and 0 to 95% by weight hydroxyl-terminated polybutadiene based on the total weight of hydroxyl-terminated polymer.

Aspect 11: The curable composition of any of Aspects 1-10, wherein the curable composition is additionally comprised of or additionally consists of at least one chain extender.

Aspect 12: The curable composition of Aspect 11, wherein the at least one chain extender comprises, consists essentially of or consists of at least one polyamine chain extender or polyol chain extender.

Aspect 13: The curable composition of any of Aspects 1-12, wherein the curable composition is additionally comprised of or additionally consists of at least one urethane catalyst.

Aspect 14: The curable composition of any of Aspects 1-13, wherein the curable composition is comprised of from about 1 to about 12 weight % organically-modified nanoclay.

Aspect 15: The curable composition of any of Aspects 1-14, wherein the at least one organically-modified nanoclay comprises, consists essentially of or consists of at least one organically-modified montmorillonite nanoclay.

Aspect 16: The curable composition of any of Aspects 1-15, wherein the at least one organically-modified nanoclay comprises, consists essentially of or consists of at least one organically-modified nanoclay that is modified with quaternary alkylammonium.

Aspect 17: A method of making a sealant, comprising curing the curable composition of any of Aspects 1-16.

Aspect 18: A sealant, comprising at least one organically-modified nanoclay and a polyurethane produced by reaction of an admixture comprising, consists essentially of or consists of at least one hydroxyl-terminated polymer selected from the group consisting of hydroxyl-terminated polyfarnesenes and hydroxyl-terminated polydienes and at least one polyisocyanate, optionally also comprising or also consisting of at least one chain extender and/or at least one urethane catalyst.

Aspect 19: An insulated glass unit comprising at least two spaced-apart sheets of glass in spaced relationship to each other, a low thermal conductivity insulating gas or mixture of gases therebetween, and a gas sealant element comprising, consisting essentially of or consisting of a sealant in accordance with Aspect 18 or a sealant obtained by curing the curable composition of any of Aspects 1-16.

DETAILED DESCRIPTION OF CERTAIN EMBODIMENTS OF THE INVENTION

According to various embodiments of the disclosed methods and compositions, a curable composition useful for making a polyurethane-based sealant having particular utility as an insulating glass sealant is provided which comprises polyisocyanate, one or more hydroxyl-terminated polymers selected from the group consisting of hydroxyl-terminated polyfarnesenes and hydroxyl-terminated polydienes and organically-modified nanoclay. The curable composition may optionally further include one or more chain extenders (such as monomeric polyols and polyamines) and/or urethane catalysts. As used herein, "polyurethane" refers to a polymer containing one or more urethane bonds and possibly also one or more urea bonds.

Hydroxyl-Terminated Polyfarnesenes

The hydroxyl-terminated polyfarnesenes (sometimes also referred to as "farnesene-based polyols" or "hydroxyl-functionalized polyfarnesenes" or "hydroxylated polyfarnesenes") employed according to the disclosed methods and compositions exhibit lower viscosities compared to hydroxyl-terminated polydienes, such as hydroxyl-terminated polybutadienes, of similar molecular weight. Therefore, hydroxyl-terminated polyfarnesenes may be handled favorably in curable compositions used to prepare polyurethanes without significant dilution with other components. In addition, the hydroxyl-terminated polyfarnesene(s) can be combined with diene-based polymeric polyols such as hydroxyl-terminated polybutadiene and hydroxyl-terminated polyisoprene to provide polymeric polyol mixtures that may be combined with one or more polyisocyanates to form the curable compositions for making the polyurethanes. The reduced viscosity characteristics of hydroxyl-terminated polyfarnesenes, as compared to hydroxyl-terminated polydienes not based on farnesene, also make it possible to incorporate higher levels of components, such as organically-modified nanoclays, which tend to increase the viscosity of such curable compositions, while providing a curable composition that has a viscosity (prior to curing) within a commercially acceptable range.

The viscosity of a hydroxyl-terminated polyfarnesene may be controlled by copolymerizing farnesene with other monomers, in particular diene monomers. Examples of such diene monomers include butadiene and isoprene. Accordingly, the term "hydroxyl-terminated polyfarnesenes" as used herein refers to both hydroxyl-functionalized homopolymers of farnesene and hydroxyl-functionalized copolymers of farnesene with one or more co-monomers. The resulting polyurethanes derived from polyfarnesene polyols in combination with polyisocyanates and organically-modified nanoclays, having excellent hydrophobicity and low moisture vapor transmission rates, are useful in a variety of applications, including in particular as insulating glass sealants.

The hydroxyl-terminated polyfarnesene may be obtained by polymerizing a monomer feed that primarily or solely includes farnesene followed by hydroxyl-functionalization of the terminal end(s) of the polymer. As used herein, "polyol" means an organic compound having more than one hydroxyl group per molecule, e.g., two, three or more hydroxyl groups per molecule. A "polymeric polyol" means a polyol containing a polymeric backbone (which may be branched or linear) comprised of a plurality of repeating units derived from one or more monomers, typically having a number average molecular weight greater than 700 g/mol. The hydroxyl-terminated polyfarnesenes have a lower viscosity compared to hydroxyl-terminated polybutadienes of the same molecular weight, but comparable hydrophobicity. Therefore, the hydroxyl-terminated polyfarnesenes may be used together with organically-modified nanoclays to manufacture polyurethanes useful as insulating glass sealants, for example, without significant dilution with other additives for the purpose of lowering viscosity.

Any methods known by those having skill in the art may be used to polymerize the farnesene monomer or the mixture of farnesene with one or more co-monomers. Anionic polymerization may be desirable because anionic polymerization allows greater control over the final molecular weight of the polymer. The living terminal ends of the polymer may also be easily quenched (reacted) using an epoxide followed by contact with a protic source, thereby providing hydroxyl functional groups. The low viscosity farnesene-based polymers may be derived by polymerizing farnesene monomer alone or with at least one other monomer, such as butadiene, isoprene and/or myrcene, for example. It is preferred that the polymers made according to various embodiments of the disclosed methods and compositions are derived from a monomer feed that is primarily composed of farnesene (e.g. at least 50, at least 60, at least 70, at least 80, or at least 90% by weight farnesene).

Farnesene exists in isomer forms, such as α-farnesene ((E,E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

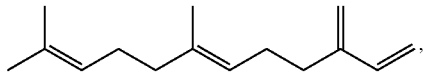

as well (E)-β-farnesene in which one or more hydrogen atoms have been replaced by another atom or group of atoms (i.e. substituted).

The hydroxyl-terminated polyfarnesenes used in the present invention may be prepared by a continuous solution polymerization process wherein an initiator, monomers, and a suitable solvent are continuously added to a reactor vessel to form the desired homopolymer or co-polymer. Alternatively, the hydroxyl-terminated polyfarnesenes may be prepared by a batch process in which all of the initiator, monomers, and solvent are combined in the reactor together substantially simultaneously. Alternatively, the hydroxyl-terminated polyfarnesenes may be prepared by a semi-batch process in which all of the initiator and solvent are combined in the reactor together before a monomer feed is continuously metered into the reactor.

Preferred initiators for providing a polymer with living terminal chain ends include, but are not limited to organic salts of alkali metals. The polymerization reaction temperature of the mixture in the reactor vessel may be maintained at a temperature of about −80 to 80° C.

As understood by those having skill in the art, anionic polymerization may continue, as long as monomer is fed to the reaction. The hydroxyl-terminated polyfarnesenes may be obtained by polymerization of farnesene and one or more comonomers. Examples of comonomers include, but are not limited to, dienes, such as butadiene, isoprene, and myrcene, or vinyl aromatics, such as styrene and alpha methyl styrene, among which butadiene, isoprene, and styrene are generally preferred. In one embodiment of the disclosed methods and compositions, a method of manufacturing a hydroxyl-terminated polyfarnesene may comprise polymerizing a monomer feed, wherein the monomer feed comprises farnesene monomer and a comonomer in which the comonomer content of the monomer feed is <95 mol. %, alternatively ≤75 mol. %, alternatively ≤50 mol. %, or alternatively ≤25 mol. %, based on the total moles of the monomer in the monomer feed. Examples of comonomers include, but are not limited to, dienes, vinyl aromatics, and combinations thereof. Accordingly, the backbone of the hydroxyl-terminated polyfarnesene may, in various embodiments of the invention, comprise 5-100 mol. % farnesene and 0-95 mol. % comonomer(s) (in particular, diene comonomer(s)); or 25-100 mol. % farnesene and 0-75 mol. % comonomer(s) (in particular, diene comonomer(s)); or 50-100 mol. % farnesene and 0-50 mol. % comonomer(s) (in particular, diene comonomer(s)); or 75-100 mol. % farnesene and 0-25 mol. % comonomer(s) (in particular, diene comonomer(s)); the total of farnesene and comonomer(s) in each case equaling 100 mol. %.

The hydroxyl-functionalized polyfarnesenes used in accordance with various embodiments of the disclosed methods and compositions may have a number average molecular weight less than or equal to 100,000 g/mol, alternatively less than or equal to 50,000 g/mol, alternatively less than or equal to 20,000 g/mol, alternatively less than or equal to 10,000 g/mol, or alternatively less than 5000 g/mol, as measured using gel permeation chromatography and polystyrene calibration. In various embodiments of the invention, the number average molecular weight of the hydroxyl-terminated polyfarnesene is at least 1000 g/mol or alternatively at least 1500 g/mol. The amount of the hydroxyl-functionalized polyfarnesene can be, for example, from about 0.5 wt. % to about 99.5 wt. % of the curable composition. The hydroxyl-terminated polyfarnesene may have a viscosity less than or equal to 100,000 cP, alternatively less than 50,000 cP, or alternatively less than or equal to 25,000 cP, or alternatively less than 10,000 cP, or alternatively less than 5000 cP, or alternatively less than 2000 cP at 25° C., as measured using a Brookfield viscometer.

The quenching step to end polymerization is accomplished by reacting living terminal end(s) of the living polymer with an alkylene oxide, such as propylene oxide or ethylene oxide, and a protic source, such as an acid, resulting in a polyol, i.e. hydroxyl groups on terminal ends of the polymer. In certain embodiments of the invention, a hydroxyl-terminated polyfarnesene composition is employed which has, on average, a hydroxyl functionality of at least about 1.8.

Hydroxyl-Terminated Polydienes

In one embodiment of the invention, the curable composition does not contain any hydroxyl-terminated polymer other than hydroxyl-terminated polyfarnesene. In another embodiment, the curable composition contains both at least one hydroxyl-terminated polyfarnesene and at least one hydroxyl-terminated polydiene. In still another embodiment, the curable compositions contains at least one hydroxyl-terminated polydiene, but no hydroxyl-terminated polyfarnesene.

According to certain embodiments of the invention, a curable composition useful for making a polyurethane is provided that comprises one or more hydroxyl-terminated polymer, wherein at least one hydroxyl-terminated polymer is a hydroxyl-terminated polyfarnesene or a hydroxyl-terminated polydiene, one or more isocyanate-group containing compounds having a functionality of at least 2 (hereafter referred to as "polyisocyanates"), one or more organically-modified nanoclays and optionally, one or more chain extenders selected from the group consisting of monomeric polyols, polyamines, and combinations thereof. The amount of at least one hydroxyl-terminated polymer (and, if present, chain extender) and one or more polyisocyanates in the curable composition may be such that the ratio of —NCO groups to active hydrogen groups (as found in hydroxyl groups and amino groups) is about 2:1 to 1:2. The use of NCO/active hydrogen ratios lower than unity results in softer, lower modulus materials. At NCO/active hydrogen ratio levels above 1.0, lower modulus material may also be prepared. However, these materials will gradually increase in hardness with time since the free NCO groups can undergo further reaction with moisture to give urea structures, or can form allophanate crosslinks (especially at elevated temperatures).

The physical properties of the curable composition, such as viscosity, may be tailored depending on the desired application for the curable composition by selection of the molecular weights of the hydroxyl-terminated polymers, as well as the ratio of hydroxyl-terminated polyfarnesene polyols to other types of hydroxyl-terminated polymers in the curable compositions described herein.

Suitable hydroxyl-terminated polydienes (which may also be referred to as hydroxylated polydienes or hydroxyl-functionalized polydienes) include, but are not limited to, polymers of dienes such as butadiene, isoprene and myrcene (including both homopolymers and copolymers) that have been functionalized with hydroxyl groups, in particular hydroxyl groups reactive with isocyanate. Generally speaking, it will be desirable for such hydroxyl-terminated polydienes to be polyols, containing more than one hydroxyl group per molecule. For example, the hydroxyl functionality of the hydroxyl-terminated polydienes may be about 1.8 or more (i.e., the hydroxyl-terminated polydiene component used in combination with one or more hydroxyl-terminated polyfarnesenes may contain an average of at least 1.8 hydroxyl groups per molecule). The hydroxyl-functionalized polydienes used in accordance with various embodiments of the disclosed methods and compositions may have a number average molecular weight less than or equal to 100,000 g/mol, alternatively less than or equal to 50,000 g/mol, alternatively less than or equal to 20,000 g/mol, alternatively less than or equal to 10,000 g/mol, or alternatively less than 5000 g/mol, as measured using gel permeation chromatography and polystyrene or polybutadiene calibration. In various embodiments of the invention, the number average molecular weight of the hydroxyl-terminated polydiene is at least 1000 g/mol or alternatively at least 1500 g/mol.

Specific examples of hydroxyl-terminated polydienes useful in the curable compositions of the present invention include, but are not limited to, hydroxyl-terminated polybutadienes, hydroxyl-terminated polyisoprenes and hydroxyl-terminated polymyrcenes and combinations thereof. Hydroxyl-terminated polydienes are well known in the art and are also available from commercial sources. For example, the hydroxyl-terminated polybutadienes sold under the brand names "Poly bd" and "Krasol" by Total Cray Valley are suitable for use in the present invention.

The curable compositions of the present invention may comprise (in addition to hydroxyl-terminated polyfarnesene and/or hydroxyl-terminated polydiene) one or more other types of hydroxyl-terminated polymers. However, it will generally be desirable, particularly in order to maintain low moisture vapor transmission rates in the cured sealant obtained from the curable composition, to employ relatively low levels, if any, of such other types of hydroxyl-terminated polymers in the curable composition. Additional types of hydroxyl-terminated polymers that may also be included in the curable composition with the hydroxyl-terminated polyfarnesene(s) and/or hydroxyl-terminated polydiene(s) include, but are not limited to, poly(oxypropylene)glycols, poly(oxyethylene)glycols, poly(oxypropylene-oxyethylene) glycols, poly(oxytetramethylene)glycols, poly(oxybutylene) glycols, poly(caprolactone)glycols, aliphatic polyester glycols such as poly(ethyleneadipate)glycols and poly (butyleneadipate)glycols, aromatic polyester glycols, and mixtures thereof. In various preferred embodiments of the invention, the curable composition does not comprise any hydroxyl-terminated polymer other than hydroxyl-terminated farnesene and/or hydroxyl-terminated polydiene or comprises less than 5% or less than 10% by weight in total of such other hydroxyl-terminated polymer (based on the total weight of hydroxyl-terminated polymer in the curable composition).

Polyisocyanates

The one or more isocyanate-group containing compounds having a functionality of at least 2 ("polyisocyanates") may exhibit several or all of the following characteristics: bulk, symmetry around the isocyanate functional groups, rigid, aromatic, crystalline and/or high purity. The polyisocyanate may be aromatic, aliphatic (including cycloaliphatic) or a mixture of aliphatic and aromatic polyisocyanates. Suitable one or more polyisocyanates include, but are not limited to, 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, m-phenylene diisocyanate, toluene-2-4-diisocyanate, toluene-2-6-diisocyanate, isophorone diisocyanate, 1,3- and/or 1,4-bis(isocyanatomethyl) cyclohexane (including cis- or trans-isomers of either), hexamethylene-1,6-diisocyanate, tetramethylene-1,4-diisocyanate, cyclohexane-1,4-diisocyanate, hexahydrotoluene diisocyanate, methylene bis(cyclohexaneisocyanate) ($H_{12}$MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate, 4,4'-dimethyldiphenylmethane-2,2',5,5'-tetraisocyanate, and isomers and combinations thereof. In some embodiments, the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-methylene diphenyl isocyanate, diphenylmethane-2,4'-diisocyanate and mixtures thereof are generically referred to as "MDI", and all may be used. Toluene-2,4-diisocyanate, toluene-2,6-diisocyanate and mixtures thereof are generically referred to as "TDI", and all may be used.

Derivatives of any of the aforementioned polyisocyanates that contain biuret, urea, carbodiimide, allophanate and/or isocyanurate groups may also be used.

Organically Modified Nanoclays

The curable compositions of the present invention further comprise one or more organically modified nanoclays. Nanoclays are nanoparticles which are typically inorganic aluminium-silicates having generally a platelet shape. Depending on their chemical composition and nanoparticle morphology, nanoclays are conventionally organized into several classes such as montmorillonite, bentonite, kaolinite, hectorite, and halloysite. Organically-modified nanoclays (also sometimes referred to as organoclays or exfoliated clays) are nanoclays which have been treated (intercalated) with one or more organic substances so as to incorporate organic species in the nanoclay, typically in the form of cationic species. Nanoclays are capable of forming chemical complexes with an intercalant (sometimes referred to as a modifying agent or an exfoliating agent) that ionically bonds to surfaces in between the layers making up the nanoclay particles. Organically-modified nanoclays thus may be considered to be types of hybrid organic-inorganic nanomaterials.

The inorganic (nanoclay) portion of the organically-modified nanoclay can be a natural or synthetic nanoclay and should have certain ion exchange properties. Illustrative suitable types of nanoclays include, without limitation, smectite clays, rectorite, vermiculite, illite micas and their synthetic analogues, including but not limited to laponite, synthetic mica-montmorillonite and tetrasilicic mica.

The nanoclays can possess an average maximum lateral dimension (width) in a first embodiment of between about 0.01 μm and about 10 μm, in a second embodiment between about 0.05 μm and about 2 μm, and in a third embodiment between about 0.1 μm and about 1 μm. The average maximum vertical dimension (thickness) of the nanoclays can in general vary in a first embodiment between about 0.5 nm and about 10 nm and in a second embodiment between about 1 nm and about 5 nm.

Useful nanoclays include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, micaceous minerals such as illite and mixed layered illite/smectite minerals such as rectorite, tarosovite, ledikite and admixtures of illites with one or more of the clay minerals named above. Any swellable layered material that sufficiently sorbs the organic molecules used as intercalants or modifying agents to increase the interlayer spacing between adjacent phyllosilicate platelets to at least about 5 angstroms, or to at least about 10 angstroms, (when the phyllosilicate is measured dry) can be used in producing the organically-modified nanoclays.

The nanoclay may be treated with any organic substance known in the art to be effective in providing an organically-modified nanoclay, wherein generally speaking the organic substance ends up being intercalated in the nanoclay in cationic form (i.e., in the form of a cationic species, such as an ammonium, phosphonium or sulfonium species). In particular, organic compounds useful for treating or modifying the nanoclays include cationic substances such as ammonium, ammonium chloride, alkylammonium (primary, secondary, tertiary and quaternary), phosphonium or sulfonium derivatives of aliphatic, aromatic or arylaliphatic amines, phosphines or sulfides. Illustrative organic compounds useful for treating the clays and layered materials include amine compounds (or the corresponding ammonium compounds) with the structure $R^3R^4R^5N$, wherein $R^3$, $R^4$, and $R^5$ are the same or different and may be $C_1$ to $C_{30}$ alkyls or alkenes, in particular $C_1$ to $C_{20}$ alkyls or alkenes. In one embodiment, the organic molecule is a long chain tertiary amine where $R^3$ is a C14 to C20 alkyl or alkene. In another embodiment, $R^4$ and/or $R^5$ may also be a C14 to C20 alkyl or alkene. In yet another embodiment of the present invention, the modifying agent can be an amine with the structure $R^6R^7R^8N$, wherein $R^6$, $R^7$, and $R^8$ are C1 to C30 alkoxy silanes or combination of C1 to C30 alkyls or alkenes and alkoxy silanes.

As is well known in the art, organically-modified nanoclays may be prepared by contacting a nanoclay possessing exchangeable cations, e.g., $Na^+$, $Ca^{2+}$, $Al^{3+}$, $Fe^{2+}$, $Fe^{3+}$, and/or $Mg^{2+}$, with at least one ammonium-, phosphonium- and/or sulfonium-containing organic compound.

Examples of particularly preferred organically-modified nanoclays include bentonite modified with bis(hydrogenated tallow alkyl) dimethyl ammonium and montmorillonite modified with methyl tallow bis(hydroxyethyl) ammonium.

Organically-modified nanoclays suitable for use in the present invention are also available from commercial sources such as, for example, the organically-modified nanoclays sold under the brand name "Cloisite" by BYK (and formerly Southern Clay).

The amount of organically-modified nanoclay, which may be a single type of organically-modified nanoclay or a combination of two or more different organically-modified nanoclays, incorporated in the curable and cured compositions in accordance with various embodiments of the invention is preferably an amount effective to decrease the cured composition's permeability to moisture, but not so much that the viscosity of the curable composition becomes too high for the curable composition to be processed and handled as may be desired. In various embodiments, the curable composition comprises at least 1, at least 2, or at least 3% by weight of organically-modified nanoclay. In other embodiments, the curable composition is comprised of not more than 20, not more than 18, not more than 16, not more than 14, not more than 12, not more than 10 or not more than 8% by weight organically-modified nanoclay.

Chain Extenders

The one or more chain extenders which may optionally be included in the curable composition may be any organic compound having two or more isocyanate-reactive groups per molecule with a relatively low number average molecular weight (generally not greater than 700 g/mol). Suitable chain extenders include monomeric polyols and polyamines (including diols and diamines), for example. Suitable polyamines include polyamines with primary and/or secondary amino groups. The number average molecular weight of each of the one or more chain extenders may be about 50 to 700 g/mol. Typically, if a chain extender or a combination of chain extenders is present, it is present in an amount of up to about 20% by weight, 15% by weight or 10% by weight, based on the total weight of hydroxyl-terminated polymer (e.g., hydroxyl-terminated polyfarnesene and/or hydroxyl-terminated polydiene) present in the curable composition. For example, the curable composition may comprise at least about 0.5, at least about 1 or at least about 2% by weight chain extender, based on the total weight of hydroxyl-terminated polymer present in the curable composition. As understood by those of skill in the art, the type and amount of chain extender will affect the elastomeric properties of the polyurethane obtained from the curable composition, such as tensile strength, elongation, and tear resistance values. When a curable composition as described herein react to form a polyurethane, the chain extenders contribute to the hard segment of the polyurethane that serve as physical cross-links between the amorphous soft segment domains. The hard segments, which are formed by the reaction between an isocyanate group and either the isocyanate-reaction group (e.g., hydroxyl or amine group) of the chain extenders, inhibit plastic flow of softer segments of the polyurethane provided by the polymeric polyol(s). The choice and amount of chain extender may also affect flexural, heat, and chemical resistance properties of the polyurethane. The chain extenders may include, but are not limited to, 1,3-butanediol, 1,4-butanediol, 1,6-hexanediol, ethylene glycol, 1,3-propanediol, 2-ethyl-1,3-hexanediol (EHD), 2-butyl-2-ethyl-1,3-propanediol (BEPG), 2,2,4-trimethyl-1,3-pentanediol (TMPD), 2,4-diethyl-1,5-pentanediol (PD-9), 1,5-pentanediol, N,N-diisopropanol aniline, neopentylglycol, 1,4-butylenediamine, 1,6-hexamethylene diamine, 1,3-cyclohexanediol, 1,4-cyclohexanediol, 1,3-cyclohexanedimethanol, 1,4-cyclohexanedimethanol, N-methylethanolamine, N-methylisopropylamine, 4-aminocyclohexanol, 1,2-diaminoethane, 1,3-diaminopropane, 1,6-diaminohexane, methylene bis(aminocyclohexane), isophorone diamine, 1,3- or 1,4-bis (aminoethyl)cyclohexane, dimethylolpropionic acid, hydroquinone dihydroxyethyl ether (HQEE), diethylene glycol, diethylenetriamine, propylene glycol, dipropylene glycol, tripropylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylene-dianiline (MDA), a complex of methylenediamine with NaCl (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), 3,5-diethyltoluene-2,4-diamine, 3,5-diethyltoluene-2,6-diamine and combinations thereof.

Urethane Catalysts

If so desired, the curable composition may be formulated to include one or more substances capable of catalyzing the reaction between polyisocyanate and hydroxyl-terminated polymer(s) (and any other isocyanate-reactive species which may be present, such as chain extender), thereby facilitating the formation of polyurethane and curing of the curable composition. Urethane catalysts useful in the curable compositions of the present invention include those known to be useful for facilitating polyurethane production. Such catalysts include metal-containing and non-metal-containing catalysts. Examples of the metals which may be present in suitable metal-containing urethane catalysts include, but are not limited to, tin, titanium, zirconium, lead, iron cobalt, antimony, manganese, bismuth and zinc. Suitable illustrative tin compounds include dimethyldineodecanoatetin, dibutyltin dilaurate, dibutyltin diacetate, dibutyltin dimethoxide, tin octoate, isobutyltintriceroate, dibutyltin oxide, solubilized dibutyl tin oxide, dibutyltin bis diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like.

Typically, curable compositions in accordance with the present invention may comprise from 1 ppm to 5000 ppm in total of one or more urethane catalysts, based on the total weight of the curable composition.

Other Components

The curable compositions for making a polyurethane, in addition to including one or more hydroxyl-terminated polymers selected from the group consisting of hydroxyl-terminated polyfarnesenes, hydroxyl-terminated polydienes and combinations thereof, one or more polyisocyanates, one or more organically-modified nanoclays, optionally, one or more urethane catalysts, and optionally, one or chain extenders may also include one or more additives, such as plasticizers, adhesion promoters, thixotropes, fillers (in addition to organically-modified nanoclay), pigments and/or stabilizers (including preservatives and antioxidants), to alter the physical or other characteristics of the curable composition and polyurethane derived therefrom and/or reduce costs.

Plasticizers may be included as extenders that also increase the softness and flexibility of the cured material in various embodiments of the disclosed methods and compositions. One or more plasticizers may be selected from the group consisting of vegetable oil, mineral oil, soybean oil, terpene resins, aromatic esters (e.g. dioctyl phthalate, diundecyl phthalate, tricresyl phosphate, and triisononyl mellitate), linear esters (e.g. di-tridecyl adipate), chlorinated paraffin, aromatic and napthenic process oils, alkyl naphthalenes, and low molecular weight polyisoprene, polybutadiene, or polybutylene resins. The amounts of plasticizer employed in the inventive curable composition can vary from 0 to about 500 phr (per hundred parts of polyurethane), between about 0 to about 100 phr, and most preferably between about 0 and about 60 phr.

Suitable fillers (in addition to the organically-modified nanoclays previously described) include, but are not limited to, carbon black, carbonates such as barium carbonate, sodium carbonate, magnesium carbonate and calcium carbonate, clays (e.g., non-organically-modified nanoclays), talcs, micas, wollastonites, metal hydroxides such as magnesium hydroxide and aluminum hydroxide, calcium hydroxide, calcium oxide, metal sulfates such as barium sulfate, metal oxides such as aluminum oxide, magnesium oxide, zinc oxide and titanium dioxide, silica, powdered metals, glass microspheres (including hollow glass microspheres) and the like. Organic filler materials may also be used.

Stabilizers known in the art may also be incorporated into the curable composition. For example, the curable composition may include one or more stabilizers for protection during the life of the polyurethane-based sealant obtained upon curing against, for example, oxygen, ozone and ultraviolet radiation. The stabilizers may also prevent thermo-oxidative degradation during elevated temperature processing. Antioxidants and UV inhibitors which interfere with the urethane curing reaction should be avoided. Preferred antioxidants are sterically hindered phenolic compounds, like butylated hydroxy toluene (BHT). Preferred UV inhibitors are UV absorbers such as benzotriazole compounds. The amount of stabilizer in the curable composition formulation will depend greatly on the intended application of the product. If processing and durability requirements are modest, the amount of stabilizer in the formulation will be less than about 1 phr. However depending on the intended use of the polyurethane, the stabilizer concentration may be as much as about 10 phr.

Formulation of the Curable Compositions

Typically, the curable composition may be formulated such that upon mixing of the polyisocyanate and the isocyanate-reactive components of the curable composition (e.g., the hydroxyl-terminated polymer(s) and optional chain extenders) at ambient temperature, reaction between these components to form a polyurethane begins to occur (i.e., the curable composition begins to cure, whereby it is converted from a liquid or paste to a solid having rubbery or elastomeric properties). Embodiments of the curable compositions of the present invention therefore encompass two-component systems, wherein a first component comprises at least hydroxyl-terminated polymer (e.g., hydroxyl-terminated polyfarnesene and/or hydroxyl-terminated polydiene) and any other isocyanate-reactive component(s) of the curable composition (but no polyisocyanate) and a second component comprises at least polyisocyanate (but no isocyanate-reactive component). Organically-modified nanoclay may be present in one or both of the components; in certain embodiments, however, organically-modified nanoclay is present in at least the first component or only in the first component. When ready to be used, the first component and the second component are mixed to form the curable composition, which is then applied to a base material or substrate to be cured.

The first component and the second component may be reacted at isocyanate indexes of at least about 60, at least about 70, at least about 80, or at least about 90 and or not more than about 150, not more than about 140, not more than about 130, not more than about 120 or not more than about 110. The isocyanate index may be, for example, from about 60 to about 150, from about 70 to about 140, from about 80 to about 130, from about 90 to about 120 or from about 100 to about 110.

The curable compositions embodied herein may be prepared by procedures well known in the polyurethane art, e.g., melt blending, extrusion blending, solution blending, dry mixing, preferably in the absence or substantial absence of moisture, to provide a substantially homogeneous mixture. The curable compositions embodied herein may be used in the same manner as known polyurethane sealants for insulated glass units.

The polyurethane-based sealants obtained according to the various embodiments of the disclosed methods and compositions exhibit excellent chemical and physical properties, including in particular low moisture vapor transmission rates.

Use of Curable Compositions as Insulating Glass Sealants

As mentioned previously, the curable compositions of the present invention find particular utility in the production of sealants for insulated glass units. That is, once cured, the curable compositions are converted to sealants comprising an elastomeric polyurethane matrix containing within it the organically-modified nanoclay(s), wherein the properties of such sealants are well-suited to meet the various criteria expected for insulating glass sealants (including, in particular, a low water vapor transmission rate).

The curable compositions of the present invention may be applied to an insulated glass unit at temperatures of, for example, about 15° C. to about 100° C. in the form of a liquid or a paste. Thereafter the curable composition cures gradually into a crosslinked solid, thereby forming the sealant. The curable composition of the present invention generally is applied to the unit as a single material, it being understood that in formulations where the hydroxyl-terminated polymer (or other isocyanate-reactive components, such as a chain extender, which may optionally be present) are reactive with the polyisocyanate at such application temperature, it may be desirable to store such components separately (e.g., as a two part formulation) until shortly before the curable composition is applied. Curing of the curable composition may, if so desired, be accelerated by heating the curable composition after application and/or by incorporating one or more urethane catalysts in the curable composition.

The curable compositions of the present invention and the polyurethane-based sealants obtained therefrom may be utilized to produce an insulated glass unit. As used herein, the term "glass" includes not only glass itself (such as clear float glass, annealed glass, tempered glass, solar glass, tinted glass and low energy glass), but also transparent plastic materials commonly substituted for glass such as acrylic and polycarbonate resins. As would be appreciated by one having ordinary skill in the art, insulated glass units are generally configured to have a first glass sheet spaced apart from a second glass sheet by a spacer frame. The spacer frame generally has a base and two spaced apart legs joined to the base to provide a substantially U-shape. The space created by the spacer frame between the first and second glass sheets defines an interior annular space of the insulated glass unit. The spacer frame, which may be a flexible spacer frame, has a first side and a second side, with the first side located adjacent an inner-surface of the first glass sheet and the second side located adjacent the inner-surface of the second glass sheet. The insulated glass sealant is provided on, e.g., may be applied to, each side of the spacer frame to hold the glass sheets to the spacer frame. As discussed above, the sealant may function as a moisture barrier or moisture impervious material to prevent moisture from penetrating into the interior annular space of the unit. While this is a well-known configuration for insulated glass units, other configurations known to an ordinary skilled artisan may be utilized and are incorporated by the present invention.

The two glass sheets may be clear glass, e.g., clear float glass, or one or both of the glass sheets and could be colored glass. Additionally, a functional coating, such as a solar control or low emissivity coating, may be applied in any conventional manner, such as MSVD, CVD, pyrolysis, sol-gel, etc., to a surface, e.g., an inner surface, of at least one of the glass sheets. The spacer frame itself may be a conventional rigid or box-type, spacer frame as is known in the art. However, it is preferred that the spacer frame be a flexible-type spacer frame which may be formed from a piece of metal, such as 201 or 304 stainless steel, or tin plated steel and bent and shaped into a substantially U-shaped, continuous spacer frame. The spacer frame is adhesively bonded around the perimeter or edges of the spaced glass sheets by the insulated glass sealant of the present invention.

The curable composition may be applied to each side of the spacer frame to hold, once cured to form a sealant, the glass sheets to the spacer frame. Additionally, or alternatively, the curable composition may be applied to each of the glass sheets. A number of methods may be employed to apply the curable composition to the spacer frame and/or the glass sheets, as would be readily appreciated by one having ordinary skill in the art. For example, the curable composition may be applied to the spacer frame as a continuous, non-continuous, uniform, or non-uniform bead. The curable composition may similarly be applied to one or more of the glass sheets. The glass sheets may then be secured to the spacer frame by the sealant formed upon curing the curable composition. As stated above, a number of other configurations and methods may be employed to seal the insulated glass unit with the insulated glass sealant resulting from the curable composition.

As will be appreciated, the components of the insulated glass unit and spacer frame may be fabricated in any convenient manner, but are then modified as discussed herein to include the insulated glass sealant of the present invention. For example, a substrate, such as a metal sheet of 201 or 304 stainless steel having a thickness, length, and width sufficient for producing a spacer frame of desired dimensions, may be formed by conventional rolling, bending, or shaping techniques. Although the curable composition may be provided on the substrate before shaping, it is generally preferred that the curable composition be applied after the spacer frame is shaped. The insulated glass unit is assembled by positioning and adhering the glass sheets to the spacer frame by the sealant in any convenient manner. An insulating gas or gases, such as air, carbon dioxide, sulfur hexafluoride, nitrogen, argon, krypton, xenon and the like and combinations thereof, may be introduced in any convenient manner into the annular space created between the first and second glass sheets. The sealant material beads resulting from curing of the curable composition may act to attach the glass sheets to the spacer frame.

It will be readily appreciated by an ordinarily skilled artisan that modifications may be made to the invention without departing from the concepts disclosed in the foregoing description. For example, although the exemplary embodiment described above utilized two glass sheets attached to the spacer, the invention is not limited to insulated glass units having only two glass sheets but may be practiced to make insulated glass units have two or more glass sheets, as are known in the art. Further, in at least one embodiment of the invention, the curable composition may be used with a spacer frame having a generally U-shaped cross-section. The invention, however, may be used with a spacer having any type of cross-section. Similarly, the invention is described above as forming a sealant bead on the spacer, on one or more glass sheets, or both. A number of other application methods may be utilized, however, in addition to utilizing a sealant bead, as would be appreciated by a skilled artisan. Still further, the layers of the curable composition may be applied or flowed onto the outer surface of the spacer and/or the glass sheets in any convenient manner, e.g., one or more layers. Accordingly, the particular embodiments described in detail herein are illustrative only and are not limiting to the scope of the invention, which is to be given the full breadth of the appended claims and any and all equivalents thereof.

As previously mentioned, in one aspect of the present invention a sealant is provided which comprises, consists essentially of, or consists of at least one organically-modified nanoclay and a polyurethane produced by reaction of an admixture comprising, consisting essentially of, or consisting of at least one hydroxyl-terminated polymer selected from the group consisting of hydroxyl-terminated polyfarnesenes and hydroxyl-terminated polydienes (in particular, hydroxyl-terminated polybutadienes) and at least one polyisocyanate, optionally also comprising, consisting essentially of or consisting of at least one chain extender and/or at least one urethane catalyst. In other embodiments, the admixture comprises, consists essentially of or consists of at least one hydroxyl-terminated polyfarnesene and at least one polyisocyanate, optionally also comprising, consisting essentially of or consisting of at least one chain extender and/or at least one urethane catalyst. In yet other embodiments, the admixture comprises, consists essentially of or consists of at least one hydroxyl-terminated polyfarnesene, at least one hydroxyl-terminated polydiene (in particular, at least one hydroxyl-terminated polybutadiene) and at least one polyisocyanate, optionally also comprising, consisting essentially of or consisting of at least one chain extender and/or at least one urethane catalyst. According to further embodiments of the invention, the admixture comprises, consists essentially of or consists of at least one hydroxyl-terminated polydiene (in particular, hydroxyl-terminated polybutadiene) and at least one polyisocyanate, optionally also comprising, consisting essentially of or consisting of at least one chain extender and/or at least one urethane catalyst.

Also provided by the present invention is an insulated glass unit comprising at least two spaced-apart sheets of glass in spaced relationship to each other, a low thermal conductivity insulating gas or mixture of gases therebetween, and a gas sealant element comprising, consisting essentially of or consisting of a sealant in accordance with any of the embodiments described in the preceding paragraph.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the compositions and processes described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Viscosities of Hydroxyl-Terminated Polyfarnesenes, Hydroxyl-Terminated Polybutadienes and Blends Thereof The Brookfield viscosities (in centipoise) of a hydroxyl-terminated polyfarnesene (number average molecular weight=2257 g/mol, as determined by gel permeation chromatography (polystyrene standard); hydroxyl functionality=≥1.8, as determined by titration and Liquid Chromatography) and certain commercially available hydroxyl-terminated polybutadienes (products of Total Cray Valley) at various temperatures are shown in Table 1. Poly Bd® R20LM is a hydroxyl-terminated polybutadiene having a hydroxyl value of 1.8 meq/g, an iodine number of 420 g/100 g, a number average molecular weight of about 1300 g/mol (polybutadiene standard), a polydispersity of about 2 and a ratio of trans:cis:vinyl of about 0.6:0.2:0.2. Poly Bd® R-45HTLO is a hydroxyl-terminated polybutadiene having a hydroxyl value of 0.84 meq/g, a hydroxyl number of about 47.1 mg KOH/g, hydroxyl functionality of 2.4-2.6, an iodine number of about 400 g/100 g, a number average molecular weight of about 2800 g/mol (polybutadiene standard), a polydispersity of about 2.5 and a ratio of trans:cis:vinyl of about 0.6:0.2:0.2.

TABLE 1

| Polymeric Polyol | 25° C. | 40° C. | 60° C. |
|---|---|---|---|
| Poly bd ® R20LM | 2142 | 827.2 | 297.1 |
| Poly bd ® R-45HTLO | 6467 | 2671 | 1045 |
| Hydroxyl-Terminated Polyfarnesene | 1289 | 427.3 | 142.2 |

Tables 2 and 3 show the Brookfield viscosity (in centipoise) of blends of hydroxyl-terminated polyfarnesene ("HTPF", as described above) and hydroxyl-terminated polybutadienes, in various weight proportions, at different temperatures. The results demonstrate that the viscosity of the polymeric polyol blend decreases as the proportion of hydroxyl-terminated polyfarnesene increases.

TABLE 2

| | % HTPF in blend with Poly bd ® R20LM | | | | | |
|---|---|---|---|---|---|---|
| | 100 | 75 | 50 | 25 | 12.5 | 0 |
| 25° C. | 1289 | 1383 | 1547 | 1795 | 1950 | 2142 |
| 40° C. | 427.3 | 482.7 | 567.1 | 678.4 | 742.8 | 827.2 |
| 60° C. | 142.2 | 165 | 198.7 | 241.4 | 266.2 | 297.1 |

TABLE 3

| | % HTPF in blend with Poly bd ® R45HTLO | | | | | |
|---|---|---|---|---|---|---|
| | 100 | 75 | 50 | 25 | 12.5 | 0 |
| 25° C. | 1289 | 1828 | 2757 | 4187 | 5882 | 6467 |
| 40° C. | 427.3 | 665.9 | 1060 | 1687 | 2376 | 2663 |
| 60° C. | 142.2 | 235.9 | 397.6 | 652.2 | 906.8 | 1045 |

Examples 1-3

Curable compositions based on hydroxyl-terminated polybutadiene and varying amounts of organically-modified nanoclay (0-6% by weight) were prepared and cured to form polyurethane sealants, in accordance with the following procedure using the amounts of the various components shown in Table 4. Hydroxyl-terminated polybutadiene (Poly Bd® R45HTLO, a product of Total Cray Valley) and (in Comparative Examples 2 and 3) organically-modified nanoclay (Cloisite® 20, a product of BYK) were mixed in a round bottom flask equipped with a mechanical stirrer at 85-90° C. under vacuum to obtain polymer nanocomposites containing 3% or 6% by weight organically-modified nanoclay. Comparative Example 1 (control) did not contain organically-modified nanoclay. The polymer nanocomposites (Comparative Examples 2 and 3) or the hydroxyl-terminated polybutadiene alone (Comparative Example 1) were mixed with polyisocyanate (Isonate™ 143 L, a product of The Dow Chemical Company) and catalyst (20% T-12 solution in DBP) in a plastic container by speed mixer for 30 seconds and the resulting curable composition then spread on a metal plate to form a film and cured at 80-85° C. for 4 hours and then at 60° C. overnight. Catalyst was not added in Example 3 (6% organically-modified nanoclay) due to poor pourability. Water vapor transmission testing was done based on ASTM E96 at 21.2° C. and 50% relative humidity.

TABLE 4

| Components | Example 1 | Example 2 | Example 3 |
|---|---|---|---|
| Organically-Modified Nanoclay (%, based on weight) | 0 | 3 | 6 |
| Hydroxyl-Terminated Polybutadiene (parts by weight) | 100 | 100 | 100 |
| Polyisocyanate (parts by weight) | 12.45 | 12.45 | 12.45 |
| Organically-Modified Nanoclay (parts by weight) | 0 | 3.48 | 7.18 |
| Catalyst | 1 drop | 1 drop | — |
| Water Vapor Transmission (g/h · m$^2$) | 0.0564 | 0.0481 | 0.0431 |
| Permeance (g/Pa · S · m$^2$) | 1.24460E−08 | 1.06101E−08 | 9.50381E−09 |

Addition of 3% and 6% by weight organically-modified nanoclay to the curable composition was found to reduce the water vapor transmission rate of the resulting polyurethane-based sealant by 15% and 24%, respectively. However, due to the viscosity increases observed, it was found not to be practical to employ more than 6% by weight organically-modified nanoclay.

Examples 4-9

A series of additional polyurethane-based sealants was prepared and evaluated, using the following components in accordance with the procedures described in Examples 1-3.
Organically-modified nanoclay: Cloisite® 20, a product of BYK.
Hydroxyl-terminated polybutadiene: Poly Bd® R45HTLO, a product of Total Cray Valley.
Hydroxyl-terminated polyfarnesene: A homopolymer of farnesene having a hydroxyl functionality of >1.8 (as determined by titration) and a number average molecular weight of 2257 g/mol as determined by gel permeation chromatography with polystyrene standard.
Polyisocyanate A: Isonate™ 143 L, a product of The Dow Chemical Company.
Polyisocyanate B: Isonate™ 50 OP, a product of The Dow Chemical Company.
Catalyst: 20% Dabco® T-12 dibutyltin dilaurate (product of Air Products & Chemicals) solution in DBP.
Table 5 lists the amounts of each component, as well as the MVTR and permeance values measured for the cured polyurethane-based sealants. The results of Examples 1-3 are also shown for comparison.

TABLE 5

| Components | Ex. 1 | Ex. 2 | Ex. 3 | Ex. 4 | Ex. 5 | Ex. 6 |
|---|---|---|---|---|---|---|
| Organically-Modified Nanoclay (%, based on weight) | 0 | 3 | 6 | 0 | 3 | 6 |

TABLE 5-continued

| Components | Ex. 1 | Ex. 2 | Ex. 3 | Ex. 4 | Ex. 5 | Ex. 6 |
|---|---|---|---|---|---|---|
| Hydroxyl-Terminated Polybutadiene (parts by weight) | 100 | 100 | 100 | 50 | 50 | 50 |
| Hydroxyl-Terminated Polyfarnesene (parts by weight) | 0 | 0 | 0 | 50 | 50 | 50 |
| Polyisocyanate A (parts by weight) | 12.45 | 12.45 | 12.45 | 0 | 0 | 0 |
| Polyisocyanate B (parts by weight) | 0 | 0 | 0 | 11.27 | 11.27 | 11.27 |
| Organically-Modified Nanoclay (parts by weight) | 0 | 3.48 | 7.18 | 0 | 3.34 | 6.68 |
| Catalyst (drops) | 1 | 1 | 1 | 2 | 2 | 2 |
| WVT, g/h · m$^2$ | 0.0564 | 0.0481 | 0.0431 | 0.0510 | 0.0476 | 0.0297 |
| Permeance, g/Pa · S · m$^2$ | 1.24460E−08 | 1.06101E−08 | 9.50381E−09 | 1.12672E−08 | 1.05064E−08 | 6.56431E−09 |
| Hardness, shore A | 52 | 52 | 56 | — | — | — |
| Tg, °C. (DSC) | −71.6 | −71.6 | −72.5 | — | — | — |
| Tensile strength, psi | 171 | 237 | 451 | — | — | — |
| Elogation at break, % | 108 | 129 | 189 | — | — | — |
| Modulus, psi | 162 | 167 | 252 | — | — | — |
| Tear strength, lbf/in | 28 | 44 | 63 | — | — | — |

Based on the results shown in Table 5, it was concluded that improved (lower) moisture vapor transmission rates were obtained when the polyol used to prepare the polyurethane-based sealant was a blend of hydroxyl-terminated polyfarnesene and hydroxyl-terminated polybutadiene, especially at an organically-modified nanoclay content of 6% by weight.

Examples 7 and 8

Examples 2 and 3 were repeated, except that Cloisite® 30B was substituted for Cloisite® 20. The mechanical properties of the sealants obtained are shown in Table 6. Example 1 (containing no organically-modified nanoclay) is listed for comparative purposes.

TABLE 6

| Components | Ex. 1 | Ex. 7 | Ex. 8 |
|---|---|---|---|
| Organically-Modified Nanoclay (%, based on weight) | 0 | 3 | 6 |
| Hardness, shore A | 52 | 45 | 47 |
| Tg, °C. (DSC) | −71.6 | −72.3 | −71.9 |
| Tensile strength, psi | 171 | 248 | 385 |
| Elogation at break, % | 108 | 208 | 250 |
| Modulus, psi | 162 | 142 | 158 |

TABLE 6-continued

| Components | Ex. 1 | Ex. 7 | Ex. 8 |
|---|---|---|---|
| Tear strength, lbf/in | 28 | 36 | 49 |

Examples 9-11

A series of additional polyurethane-based sealants was prepared and evaluated, using the following components in accordance with the procedures described in Examples 1-3.
Organically-modified nanoclay: Cloisite® 20, a product of BYK.
Hydroxyl-terminated polybutadiene: Poly Bd® R45HTLO, a product of Total Cray Valley.
Diol Chain Extender: 2-ethyl-1,3-hexanediol (EHD).
Polyisocyanate A: Isonate™ 143 L, a product of The Dow Chemical Company.
Catalyst: 20% Dabco® T-12 dibutyltin dilaurate (product of Air Products & Chemicals) solution in DBP.

Table 7 lists the amounts of each component, as well as the mechanical properties measured for the cured polyurethane-based sealants.

TABLE 7

| Components | Ex. 9 | Ex. 10 | Ex. 11 |
|---|---|---|---|
| Organically-Modified Nanoclay (%, based on weight) | 0 | 3 | 6 |

TABLE 7-continued

| Components | Ex. 9 | Ex. 10 | Ex. 11 |
|---|---|---|---|
| Hydroxyl-Terminated Polybutadiene (parts by weight) | 100 | 100 | 100 |
| Diol Chain Extender | 5.99 | 5.99 | 5.99 |
| Polyisocyanate A (parts by weight) | 24.91 | 24.91 | 24.91 |
| Organically-Modified Nanoclay (parts by weight) | 0 | 4.05 | 8.36 |
| Catalyst (drops) | 1 | 1 | 1 |
| Hardness, shore A | 66 | 68 | 62 |
| Tg, ° C. (DSC) | −73.5 | −69.3 | −70.4 |
| Tensile strength, psi | 604 | 733 | 742 |
| Elogation at break, % | 246 | 221 | 260 |
| Modulus, psi | 326 | 383 | 322 |
| Tear strength, lbf/in | 112 | 117 | 122 |

Examples 12 and 13

Examples 10 and 11 were repeated, except that Cloisite® 30B was substituted for Cloisite® 20. The mechanical properties of the sealants obtained are shown in Table 8. Example 9 (containing no organically-modified nanoclay) is listed for comparative purposes.

TABLE 8

| Components | Ex. 9 | Ex. 12 | Ex. 13 |
|---|---|---|---|
| Organically-Modified Nanoclay (%, based on weight) | 0 | 3 | 6 |
| Hardness, shore A | 66 | 63 | 65 |
| Tg, ° C. (DSC) | −73.5 | −70.7 | −72.2 |
| Tensile strength, psi | 604 | 750 | 844 |
| Elogation at break, % | 246 | 284 | 265 |
| Modulus, psi | 326 | 301 | 342 |
| Tear strength, lbf/in | 112 | 98 | 102 |

What is claimed is:

1. A curable composition useful for producing an insulating glass sealant, wherein the curable composition comprises at least one organically-modified nanoclay, at least one hydroxyl-terminated polyfarnesene, and at least one polyisocyanate.

2. The curable composition of claim 1, wherein the at least one hydroxyl-terminated polyfarnesene has a number average molecular weight of from about 1000 to about 20,000 g/mole.

3. The curable composition of claim 1, wherein the at least one hydroxyl-terminated polyfarnesene has an average hydroxyl functionality of at least about 1.8.

4. The curable composition of claim 1, wherein the at least one hydroxyl-terminated polyfarnesene comprises at least one hydroxyl-terminated polyfarnesene which is a hydroxyl-terminated polyfarnesene homopolymer.

5. The curable composition of claim 1, wherein the at least one hydroxyl-terminated polyfarnesene comprises at least one hydroxyl-terminated polyfarnesene which is a hydroxyl-terminated polyfarnesene copolymer comprised of copolymerized units of farnesene and at least one diene co-monomer.

6. The curable composition of claim 1, wherein the curable composition is additionally comprised of at least one chain extender.

7. The curable composition of claim 6, wherein the at least one chain extender comprises at least one polyamine chain extender or polyol chain extender.

8. The curable composition of claim 1, wherein the curable composition is comprised of from about 1 to about 12 weight % organically-modified nanoclay.

9. The curable composition of claim 1, wherein the at least one organically-modified nanoclay comprises at least one organically-modified montmorillonite nanoclay.

10. The curable composition of claim 1, wherein the at least one organically-modified nanoclay comprises at least one organically-modified nanoclay that is modified with quaternary alkylammonium.

11. A curable composition useful for producing an insulating glass sealant, wherein the curable composition comprises at least one organically-modified nanoclay, at least one hydroxyl-terminated polymer comprised of at least one hydroxyl-terminated polyfarnesene and at least one hydroxyl-terminated polybutadiene, and at least one polyisocyanate.

12. A curable composition useful for producing an insulating glass sealant, wherein the curable composition comprises at least one organically-modified nanoclay, at least one hydroxyl-terminated polymer selected from the group consisting of hydroxyl-terminated polyfarnesenes and hydroxyl-terminated polydienes, and at least one polyisocyanate, wherein the curable composition is comprised of from 5% to 100% by weight hydroxyl-terminated polyfarnesene and 0 to 95% by weight hydroxyl-terminated polybutadiene based on the total weight of hydroxyl-terminated polymer.

13. A curable composition useful for producing an insulating glass sealant, wherein the curable composition comprises at least one organically-modified nanoclay, at least one hydroxyl-terminated polymer selected from the group consisting of hydroxyl-terminated polyfarnesenes and hydroxyl-terminated polydienes, at least one polyisocyanate, and at least one urethane catalyst.

14. The curable composition of claim 13, wherein the at least one organically-modified nanoclay comprises at least one organically-modified montmorillonite nanoclay.

15. The curable composition of claim 13, wherein the curable composition is additionally comprised of at least one chain extender.

16. The curable composition of claim 13, wherein the at least one hydroxyl-terminated polymer has an average hydroxyl functionality of at least about 1.8.

17. A method of making a sealant, comprising curing the curable composition of claim 1.

18. A sealant, comprising at least one organically-modified nanoclay and a polyurethane produced by reaction of an admixture comprising at least one hydroxyl-terminated polyfarnesene and at least one polyisocyanate.

19. An insulated glass unit comprising at least two spaced-apart sheets of glass in spaced relationship to each other, a low thermal conductivity insulating gas or mixture of gases therebetween, and a gas sealant element comprising a sealant in accordance with claim 18.

\* \* \* \* \*